United States Patent
Ryu et al.

(10) Patent No.: US 10,212,731 B2
(45) Date of Patent: Feb. 19, 2019

(54) TXOP PROTECTION METHOD AND APPARATUS

(71) Applicant: LG ELECTRONICS INC., Seoul (KR)

(72) Inventors: Kiseon Ryu, Seoul (KR); Wookbong Lee, Seoul (KR); Suhwook Kim, Seoul (KR); Jeongki Kim, Seoul (KR); Giwon Park, Seoul (KR); Hangyu Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/509,149

(22) PCT Filed: Dec. 31, 2014

(86) PCT No.: PCT/KR2014/013099
§ 371 (c)(1),
(2) Date: Mar. 6, 2017

(87) PCT Pub. No.: WO2016/035943
PCT Pub. Date: Mar. 10, 2016

(65) Prior Publication Data
US 2017/0303309 A1    Oct. 19, 2017

Related U.S. Application Data

(60) Provisional application No. 62/045,574, filed on Sep. 4, 2014.

(51) Int. Cl.
*H04W 74/00* (2009.01)
*H04W 74/08* (2009.01)

(52) U.S. Cl.
CPC ....... *H04W 74/006* (2013.01); *H04W 74/004* (2013.01); *H04W 74/0816* (2013.01)

(58) Field of Classification Search
None
See application file for complete search history.

(56) References Cited

U.S. PATENT DOCUMENTS

| 2005/0002355 A1* | 1/2005 | Takano ................. H04L 1/1671 370/329 |
| 2011/0150004 A1* | 6/2011 | Denteneer ............ H04L 5/0023 370/476 |

(Continued)

FOREIGN PATENT DOCUMENTS

| KR | 1020140057412 | 5/2014 |
| KR | 1020140066261 | 5/2014 |

(Continued)

OTHER PUBLICATIONS

PCT International Application No. PCT/KR2014/013099, International Search Report dated May 14, 2015, 3 pages.

*Primary Examiner* — Otis L Thompson, Jr.
(74) *Attorney, Agent, or Firm* — Lee, Hong, Degerman, Kang & Waimey

(57) ABSTRACT

Provided is a method and apparatus for protecting a TXOP in a wireless communication system. The method for protecting a TXOP may comprise the steps of: receiving a trigger frame containing information on a first interval for an exchange of multiple clear-to-send (CTS) frames from a transmission station (STA) by a reception STA; and transmitting CTS frames to the transmission STA in the first interval by the reception STA.

20 Claims, 9 Drawing Sheets

(56) References Cited

U.S. PATENT DOCUMENTS

| | | | |
|---|---|---|---|
| 2011/0194644 A1* | 8/2011 | Liu et al. | H04L 5/0023 |
| | | | 375/295 |
| 2011/0317630 A1* | 12/2011 | Zhu et al. | H04W 74/0816 |
| | | | 370/329 |
| 2012/0082200 A1* | 4/2012 | Verikoukis | H04L 1/0026 |
| | | | 375/227 |
| 2012/0087358 A1 | 4/2012 | Zhu et al. | |
| 2013/0229996 A1* | 9/2013 | Wang et al. | H04W 72/0413 |
| | | | 370/329 |

FOREIGN PATENT DOCUMENTS

| | | |
|---|---|---|
| KR | 1020140095059 | 7/2014 |
| WO | 2013191439 | 12/2013 |

\* cited by examiner

TXOP PROTECTION METHOD AND APPARATUS

CROSS-REFERENCE TO RELATED APPLICATIONS

This application is the National Stage filing under 35 U.S.C. 371 of International Application No. PCT/KR2014/013099, filed on Dec. 31, 2014, which claims the benefit of U.S. Provisional Application No. 62/045,574, filed on Sep. 4, 2014, the contents of which are all hereby incorporated by reference herein in their entirety.

BACKGROUND OF THE INVENTION

Field of the Invention

The present invention relates to wireless communication, and more particularly to a method and an apparatus for protecting a TXOP in a wireless communication system.

Related Art

Wi-Fi is a wireless local area network (WLAN) technology that allows a wireless apparatus to access the Internet in a frequency band of 2.4 GHz, 5 GHz, or 60 GHz. The WLAN is based on an Institute of Electrical and Electronics Engineers (IEEE) 802.11 standard.

An IEEE 802.11n standard supports multiple antennas and provides maximum 600 Mbit/s data rate. A system that supports IEEE 802.11n is referred to as a high throughput (HT) system.

An IEEE 802.11ac standard operates primarily in the 5 GHz band and provides data rate of 1 Gbit/s or more. The IEEE 802.11ac supports downlink multi-user multiple input multiple output (DL MU-MIMO). A system that supports IEEE 802.11ac is referred to as a very high throughput (VHT) system.

IEEE 802.11ax is developed as next-generation WLAN for coping with higher data rate and a higher user load. A scope of the IEEE 802.11ax may include 1) enhancement of an 802.11 physical (PHY) layer and a medium access control (MAC) layer, 2) enhancement of spectrum efficiency and area throughput, 3) performance enhancement in an environment in which an interference source exists, a dense heterogeneous network environment, and an environment in which the high user load exists, and the like.

As described above, various channel bandwidths are available from 20 MHz to 160 MHz in a WLAN system. Accordingly, determination of Wi-Fi performance is an important factor to determine a suitable channel bandwidth for communication between a transmission terminal and a reception terminal.

In order to determine a suitable channel bandwidth for communication between a transmission terminal and a reception terminal, a dynamic channel bandwidth configuration protocol based on a request to send (RTS) frame and a clear to send (CTS) frame is developed from IEEE 802.11ac. An initial RTS frame and an initial CTS frame are created in order to reduce a hidden node issue and a data frame collision overhead. The transmission terminal transmits an RTS frame to the reception terminal before transmitting a data frame. A purpose terminal receiving the RTS frame responds the transmission terminal by the CTS frame. Third terminals receiving the RTS frame and the CTS frame may delay a medium access for a predetermined time to protect a data frame to be next transmitted.

However, since exchange of RTS/CTS frames is achieved by simple transmission or is achieved between an AP and a designated specific STA, the RTS/CTS frame exchange is not suitable in an uplink Multi (MU) user environment.

SUMMARY OF THE INVENTION

The present invention provides a method and an apparatus for protecting a TXOP.

In accordance with an aspect of the present invention, there is provided a method for protecting a TXOP in a wireless communication system, the method including: receiving a trigger frame containing information on a first duration for exchange of multiple clear-to-send (CTS) frames from a transmission station (STA) by a reception STA; and transmitting CTS frames to the transmission STA in a first duration by the reception STA.

According to an aspect of the present invention, a TXOP for downlink data transmission is protected.

An aspect of the present invention provides a method and an apparatus for generating and transmitting a frame to protect a downlink TXOP.

DESCRIPTION OF EXEMPLARY EMBODIMENTS

A wireless local area network (WLAN) system which follows Institute of Electrical and Electronics Engineers (IEEE) 802.11n standards is referred to as a high throughput (HT) system and a system which follows IEEE 802.11ac standards is referred to as very high throughput (VHT) system. Compared therewith, a WLAN system which supports orthogonal frequency division multiple access (OFDMA) is referred to as a high efficiency WLAN (HEW) system or a high efficiency (HE) system. A name called HEW or HE is just used for distinguishment from a conventional WLAN and has no any limit.

The proposed WLAN system may operate in a band of 6 GHz or less or a 60 GHz band. The band of 6 GHz or less may include at least one of a 2.4 GHz band and a 5 GHz band.

A station (STA) may be called various names including a wireless apparatus, a mobile station (MS), a network interface device, a wireless interface device, and the like. If the STA is not separately distinguished from an access point (AP) in terms of a function, the STA may include a non-AP STA or AP. When the STA is described based on communication of the STA and the AP, the STA may be interpreted as the non-AP STA. When the STA is described based on communication of the STA and the STA, the STA may be the non-AP STA or the AP.

Figure 1:
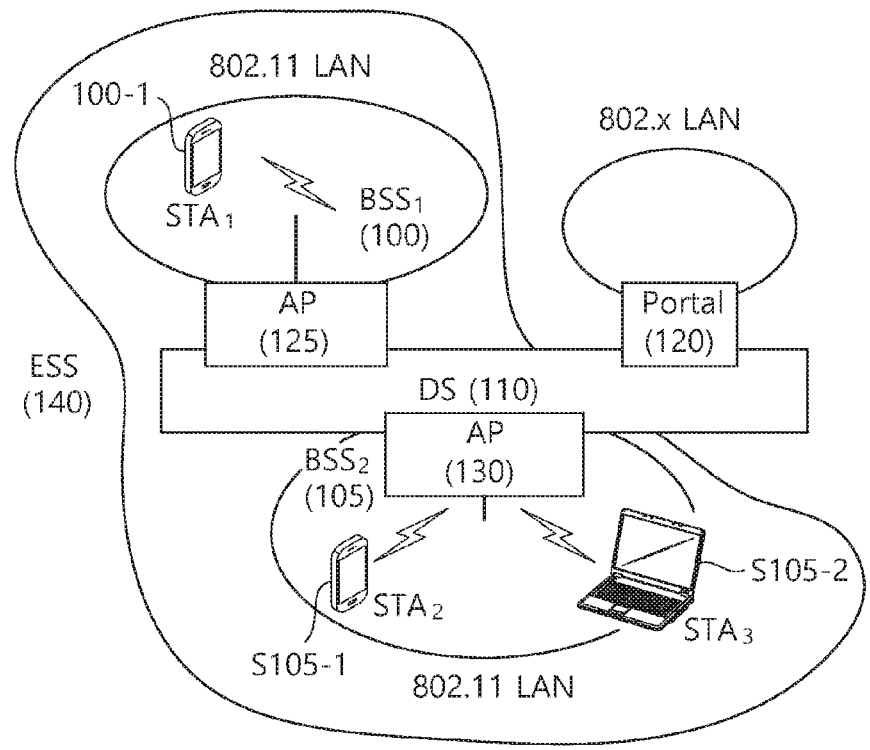
FIG. 1 is a concept view illustrating the structure of a wireless local area network (WLAN).
Figure 1:
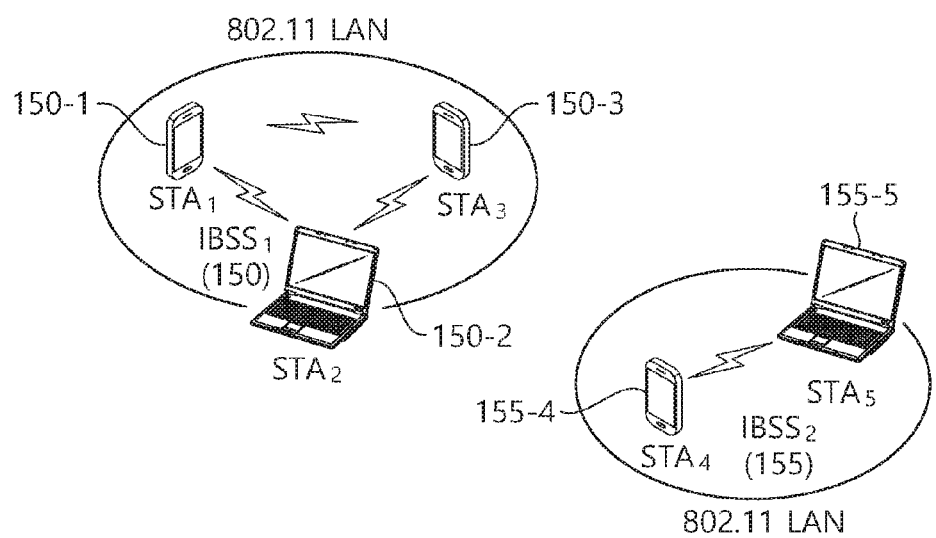

FIG. 1 is a concept view illustrating the structure of a wireless local area network (WLAN).

An upper part of FIG. 1 shows the structure of the IEEE (institute of electrical and electronic engineers) 802.11 infrastructure network.

Referring to the upper part of FIG. 1, the WLAN system may include one or more basic service sets (BSSs, 100 and 105). The BSS 100 or 105 is a set of an AP such as AP (access point) 125 and an STA such as STA 1 (station) 100-1 that may successfully sync with each other to communicate with each other and is not the concept to indicate a particular area. The BSS 105 may include one AP 130 and one or more STAs 105-1 and 105-2 connectable to the AP 130.

The infrastructure BSS may include at least one STA, APs 125 and 130 providing a distribution service, and a distribution system (DS) 110 connecting multiple APs.

The distribution system 110 may implement an extended service set (ESS) 140 by connecting a number of BSSs 100 and 105. The ESS 140 may be used as a term to denote one network configured of one or more APs 125 and 130 connected via the distribution system 110. The APs included in one ESS 140 may have the same SSID (service set identification).

The portal 120 may function as a bridge that performs connection of the WLAN network (IEEE 802.11) with other network (for example, 802.X).

In the infrastructure network as shown in the upper part of FIG. 1, a network between the APs 125 and 130 and a network between the APs 125 and 130 and the STAs 100-1, 105-1, and 105-2 may be implemented. However, without the APs 125 and 130, a network may be established between the STAs to perform communication. The network that is established between the STAs without the APs 125 and 130 to perform communication is defined as an ad-hoc network or an independent BSS (basic service set).

A lower part of FIG. 1 is a concept view illustrating an independent BSS.

Referring to the lower part of FIG. 1, the independent BSS (IBSS) is a BSS operating in ad-hoc mode. The IBSS does not include an AP, so that it lacks a centralized management entity. In other words, in the IBSS, the STAs 150-1, 150-2, 150-3, 155-4 and 155-5 are managed in a distributed manner. In the IBSS, all of the STAs 150-1, 150-2, 150-3, 155-4 and 155-5 may be mobile STAs, and access to the distribution system is not allowed so that the IBSS forms a self-contained network.

Hereinafter, in an embodiment of the present invention, data (alternatively, or a frame) which an AP transmits to an STA may be expressed as downlink data (alternatively, a downlink frame) and data (alternatively, a frame) which the STA transmits to the AP may be expressed as a term called uplink data (alternatively, an uplink frame). Further, transmission from the AP to the STA may be expressed as downlink transmission and transmission from the STA to the AP may be expressed as a term called uplink transmission.

Figure 2:
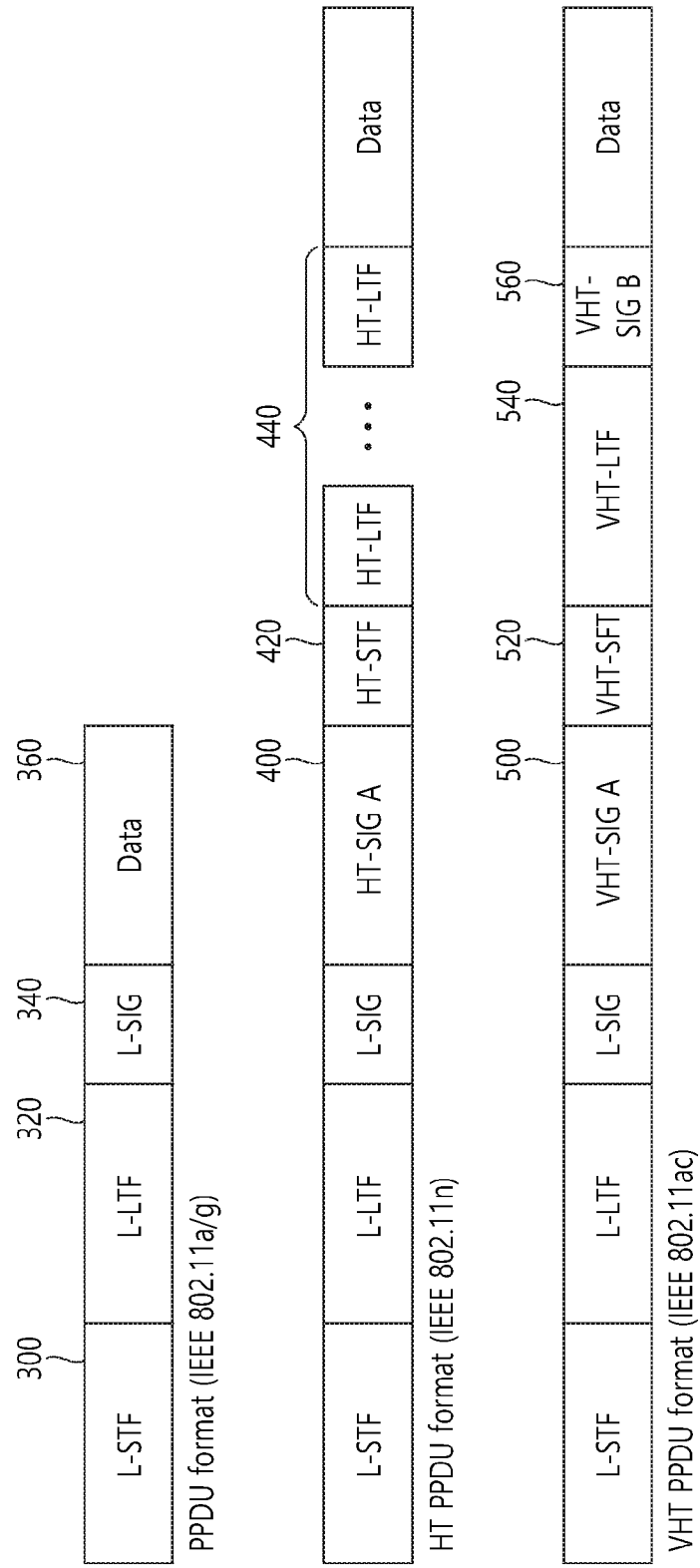
FIG. 2 is a conceptual view illustrating a PPDU format in the related art.

FIG. 2 is a conceptual view illustrating a PPDU format in the related art. A Physical layer Protocol Data Unit (PPDU) is a data block generated in a physical (PHY) layer in an IEEE 802.11 standard.

As a PPDU format in an uppermost part of FIG. 2, a non-high throughput (HT) physical layer convergence procedure (PLCP) protocol data unit (PPDU) format supporting IEEE 802.11a/g is disclosed. The non-HT PPDU format may be expressed even as a term called a legacy PPDU format.

The non-HT PPDU format may include a legacy-short training field (L-STF) 300, a legacy-long training field (L-LTF) 320, a legacy SIGNAL field (L-SIG) 340, and data 360.

The L-STF 300 may include a short training orthogonal frequency division multiplexing (OFDM) symbol. The L-STF 300 may be used for frame detection, automatic gain control (AGC), diversity detection, and coarse frequency/time synchronization.

An L-LTF 320 may include a long training orthogonal frequency division multiplexing (OFDM) symbol. The L-LTF 320 may be used for fine frequency/time synchronization and channel prediction.

An L-SIG 340 may be used for transmitting control information. The L-SIG 340 may include information regarding a data rate and a data length.

The data 360 as a payload may include a Service field, a scrambled PLCP service data unit (PSDU), tail bits, and padding bits.

A middle part of FIG. 2 is a conceptual view illustrating a high throughput (HT) PPDU format.

The HT PPDU format of FIG. 2 represents an HT-mixed format PPDU for supporting IEEE 802.11n and IEEE 802.11a/g.

The HT-mixed format PPDU may further include an HT-SIG 400, an HT-STF 420, and an HT-LTF 440 in addition to the non-HT PPDU format.

The HT-SIG 400 may include information for interpreting the HT-mixed format PPDU. For example, the HT-SIG 400 may include a modulation and coding scheme (MCS), PSDU length information, space time block coding (STBC) information, and the like.

The HT-STF 420 may be used for enhancement of AGC performance, timing synchronization, and frequency synchronization. A whole length of the HT-STF 420 as 4 us may be the same as that of the L-STF, but a cyclic delay value of the HT-STF 420 may be different from that of the L-STF.

The HT-LTF 440 may be used for estimating a multiple input multiple output (MIMO) channel and estimating carrier frequency offset (CFO). Since the STA that supports the IEEE 802.11n needs to estimate channels as many as space time streams (alternatively, spatial streams), the number of HT-LTFs 440 may increase according to the number of space time streams.

A lower part of FIG. 2 is a conceptual view illustrating a very high throughput (VHT) PPDU format.

The VHT PPDU format may include an L-STF, an L-LTF, an L-SIG, a VHT-SIG-A, a VHT-STF, a VHT-LTF, a VHT-SIG-B, and data.

The L-STF field, the L-LTF field, and the L-SIG field are fields included in the non-HT PPDU format as described above. Residual VHT-SIG-A 500, VHT-STF 520, VHT-LTF 540, and VHT-SIG-B 560 may be included only in the VHT PPDU format.

The VHT-SIG-A 500 may include information for interpreting the VHT PPDU format. The VHT-SIG-A 500 may include a VHT-SIG-A1 and a VHT-SIG-A2. The VHT-SIG-A1 may include information on a bandwidth of a used channel, whether space time block coding is applied, a group identifier (identifier) indicating a group used for transmission by grouped STAs in multi-user (MU)-MIMO, and information on the number of used streams.

The VHT-SIG-A2 may include information on whether a short guard interval (GI) is used, forward error correction (FEC) information, information on a modulation and coding scheme (MCS) for a single user, information on the type of channel coding for a plurality of users, beamforming related information, redundancy bits for cyclic redundancy checking (CRC), and tail bits of a convolutional decoder.

The VHT-STF 520 may be used for enhancing automatic gain control estimation in an MIMO environment.

The VHT-LTF 540 is used for estimating the channel in the MIMO environment.

The VHT-SIG-B 560 may include information on each STA, that is, information on the length of the PSDU and the MCS, the tail bits, and the like.

Figure 3:
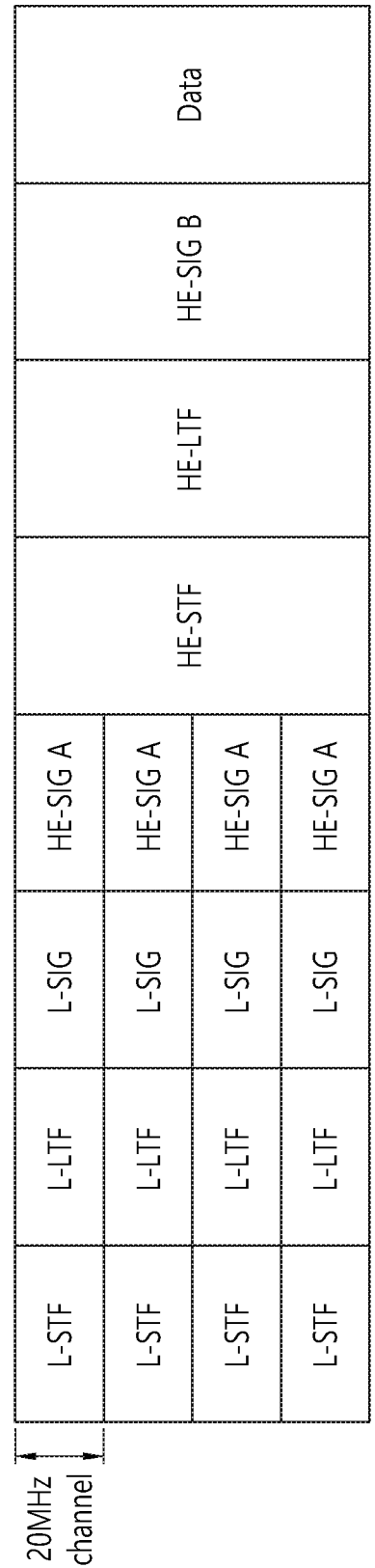
FIG. 3 is a conceptual view illustrating one example of an HE PPDU format.

FIG. 3 is a diagram illustrating one example of a high efficiency (HE) PPDU format.

FIG. 3 illustrates a PPDU transmitted in a total 80 MHz bandwidth through four 20 MHz channels. The PPDU may be transmitted through at least one 20 MHz channel. Herein, illustrated is an example in which the 80 MHz band is allocated to one reception STA. The respective 20 MHz channels may be allocated to different reception STAs.

The L-STF, the L-LTF, and the L-SIG may be the same as the L-STF, the L-LTF, and the L-SIG of the VHT PPDU. The L-STF, the L-LTF, and the L-SIG may be transmitted in an orthogonal frequency division multiplexing (OFDM) symbol generated based on 64 fast Fourier transform (FFT) points (alternatively, 64 subcarriers) in each 20 MHz channel.

The HE-SIG A may include common control information commonly received by the STA that receives the PPDU. The HE-SIG A may be transmitted in 2 or 3 OFDM symbols.

A table given below exemplifies information included in the HE-SIG A. A field name or a bit count is just an example and all fields are not required.

TABLE 1

| Field | Bit | Description |
| --- | --- | --- |
| Bandwidth | 2 | Indicates the bandwidth in which the PDDU is transmitted. e.g., 20 MHz, 40 MHz, 80 MHz, or 160 MHz |
| Group ID | 6 | Indicates the STA or the STA group which will receive the PPDU |
| Stream information | 12 | Represents the number of or positions of spatial streams which will be received by the STA. Alternatively, the spatial stream which will be received by each STA in the STA group |
| UL(uplink) indication | 1 | Represents whether the PPDU is used for the AP (uplink) or the STA (downlink). |
| MU indication | 1 | Represents the SU-MIMO PPDU or the MU-MIMO PPDU. |
| GI (Guard interval) indication | 1 | Represents whether a short GI or a long GI is used. |
| Allocation information | 12 | Indicates a band or channel (subchannel index or subband index) allocated to each STA in the bandwidth in which the PPDU is transmitted |
| Transmission power | 12 | Indicates transmission power for each allocated channel |

The HE-STF may be used for enhancing the AGC estimation in the MIMO transmission. The HE-LTF may be used for estimating the MIMO channel.

The HE-SIG B may include user specific information required for each STA to receive data (that is, physical layer service data unit (PSDU)) thereof. The HE-SIG B may be transmitted in 1 or 2 OFDM symbols. For example, the HE-SIG B may include information on the length of the corresponding PSDU and the modulation and coding scheme (MCS) of the corresponding PSDU.

The L-STF, L-LTF, L-SIG, and HE-SIG A may be repeatedly transmitted by the unit of the 20-MHz channel. That is, when the PPDU is transmitted to four 20 MHz channels, the L-STF, L-LTF, L-SIG, and HE-SIG A may be duplicatively transmitted for each 20 MHz channel.

From the HE-STF (alternatively, after the HE-SIG A), the FFT size per frequency may further increase. For example, 256 FFT may be used in the 20-MHz channel, 512 FFT may be used in the 40-MHz channel, and 1024 FFT may be used in the 80-MHz channel. When the FFT size increases, an OFDM subcarrier spacing decreases, and as a result, the number of OFDM subcarriers per frequency increases, but on the contrary, an OFDM symbol time may increase. The length of the GI after the HE-STF may be set to be the same as the length of the GI of the HE-SIG A.

Figure 4:
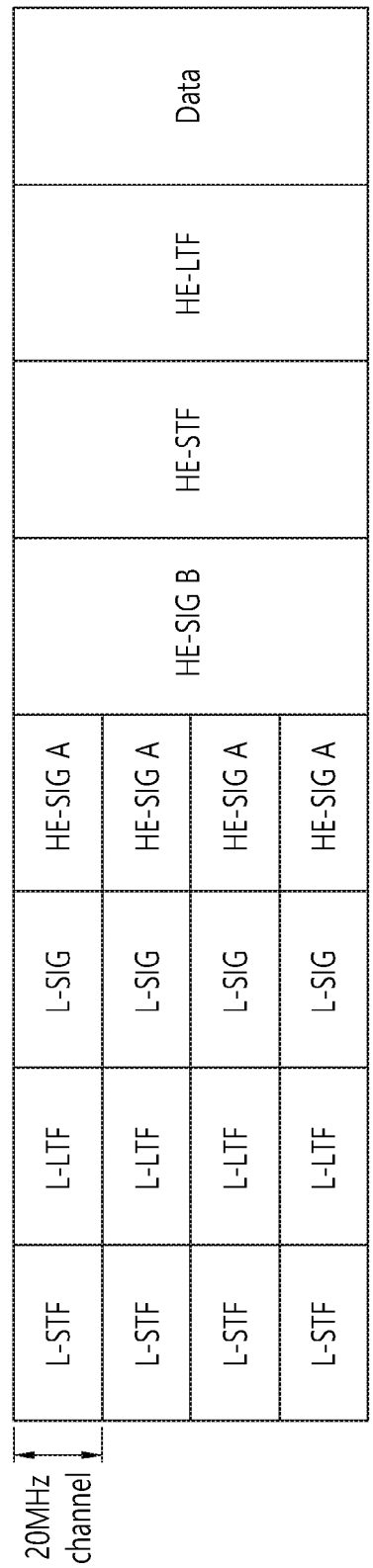
FIG. 4 is a conceptual view illustrating another example of the HE PPDU format.

FIG. 4 is a conceptual view illustrating another example of the HE PPDU format.

The PPDU format of FIG. 4 is the same as the PPDU format of FIG. 2 except the HE-SIG B is disposed next to the HE-SIG A. From the HE-STF (alternatively, after the HE-SIG B), the FFT size per frequency may further increase.

Figure 5:
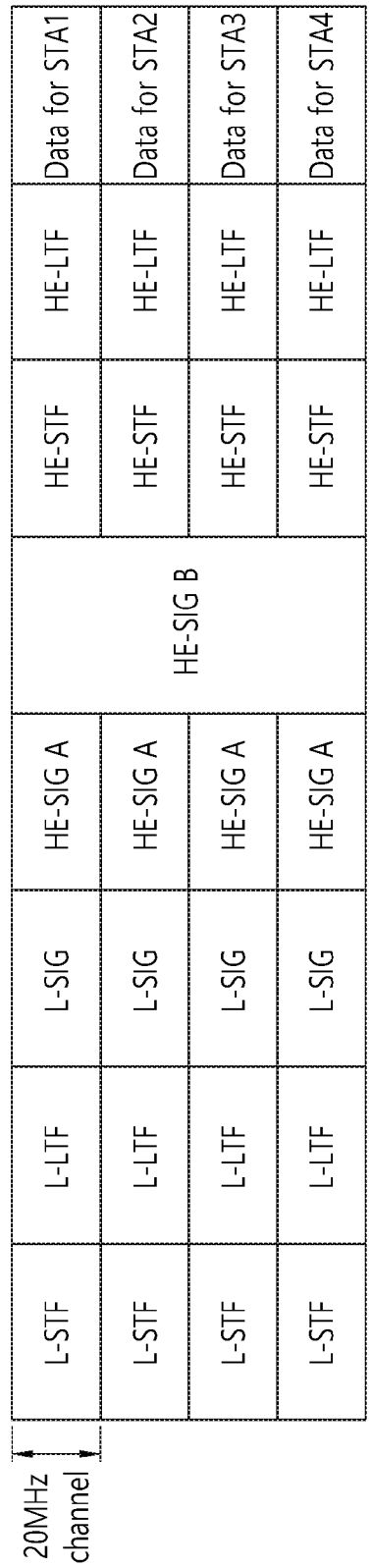
FIG. 5 is a conceptual view illustrating yet another example of the HE PPDU format.

FIG. 5 is a conceptual view illustrating yet another example of the HE PPDU format.

The HE-SIG B is disposed next to the HE-SIG A. The respective 20 MHz channels are allocated to different STAs (STA 1, STA 2, STA 3, and STA 4). The HE-SIGB includes information specific to each STA, but is encoded throughout a full band. That is, all STAs may receive the HE-SIGB. From the HE-STF (alternatively, after the HE-SIG B), the FFT size per frequency may further increase.

When the size of the FFT increases, the legacy STA supporting the existing IEEE 802.11a/g/n/ac may not decode the corresponding PPDU. The L-STF, L-LTF, and L-SIG are transmitted through 64 FFT in the 20-MHz channel so as to be received by the legacy STA for coexistence of the legacy STA and the HE STA coexist. For example, the L-SIG occupies one OFDM symbol and one OFDM symbol time is 4 us, and the GI is 0.8 us.

Transmission opportunity (TXOP) means an interval of time where a specific STA has a right disclosing a frame exchange sequence on a radio medium. An STA acquiring the TXOP refers to a TXOP holder and the other side refers to a TXOP responder. In general, the TXOP is acquired by contention, and refers to exchange of a representative processor request to send (RTS)/clear to send (CTS) for protecting the TXOP.

Figure 6:
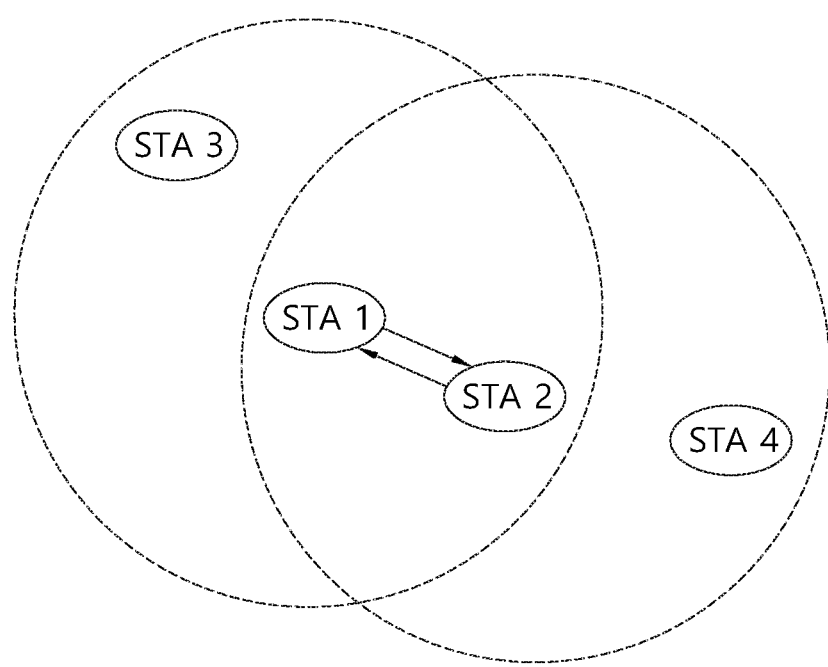
FIG. 6 is a concept diagram illustrating an example of exchange of RTS/CTS frames.

FIG. 6 is a concept diagram illustrating an example of exchange of RTS/CTS frames.

In order to solve a hidden node issue, the RTS frame may exchange with the CTS frame. Neighboring STAs may know whether to transmit or receive data between two STAs based on the RTS frame and the CTS frame.

It is assumed that an STA 1 wants to transmit data to an STA 2. If a channel is idle through contention, the STA 1 sends the RTS frame to the STA 2. As response thereto, the STA 2 sends to the CTS frame to the STA 1. An STA 3 in coverage of the STA 3 may not perform channel access by overhearing the RTS frame and to configure a Network Allocation Vector (NAV). An STA 4 in coverage of the STA 2 may not perform channel access by overhearing the CTS frame to configure the NAV not to perform channel access.

An exchange scheme between the RTS frame and the CTS frame is achieved by unicast transmission or is achieved only between an AP and a designated specific STA. An uplink multi-user (MU) environment is not considered.

Downlink (DL) MU transmission means that an AP acquiring the TXOP simultaneously or sequentially transmits data to a plurality of STAs. Uplink (UL) MU transmission means that a plurality of STAs simultaneously or sequentially transmits data to the AP.

According to an existing WLAN system, since exchange between the RTS frame and the CTS frame is possible only by one-to-one transmission between the AP and the STA, a DL MU TXOP with respect to a DL MU frame may not be protected by the AP. Likewise, an UL MU TXOP with respect to the UL MU frame may not be protected.

Figure 7:
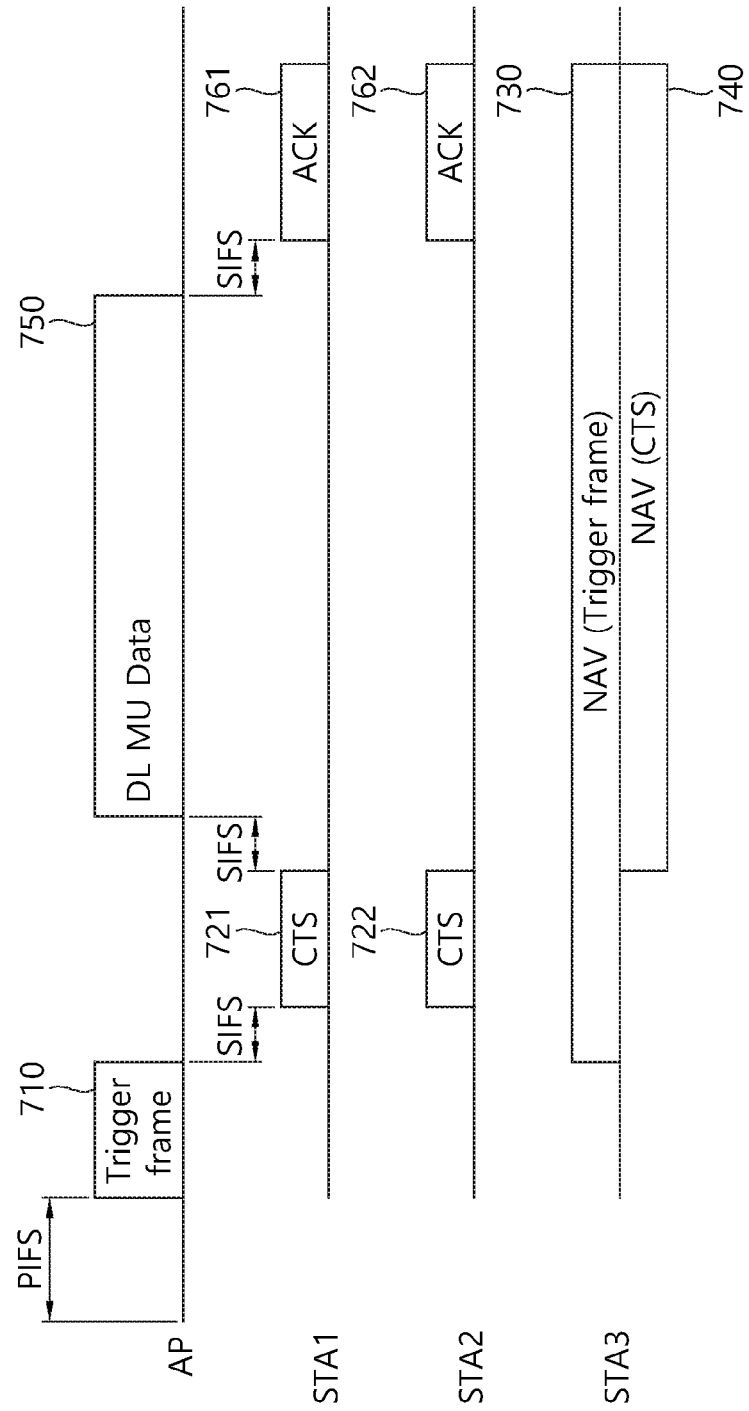
FIG. 7 illustrates exchange of RTS/CTS frames according to an embodiment of the present invention.

FIG. 7 illustrates exchange of RTS/CTS frames according to an embodiment of the present invention.

The STA 3 may update NAV configuration based on a trigger frame or the CTS frame.

A TXOP with respect to an UL MU data frame may be protected through a trigger frame or a CTS frame. The trigger frame may include interval information for TXOP protection with respect to the MU CTS frame and TXOP protection with respect to the UL MU data frame.

A following table 2 illustrates a field included in the trigger frame. A field name is illustrative purpose only, all fields are not essential, but some fields may be omitted.

TABLE 2

| Field name | Description |
| --- | --- |
| Trigger frame type | Indicates a type of a frame to be transmitted. For example, in a case of two bits, '00' may be a CTS frame, '01' may be a data frame, and '10' may be a control frame. |
| STA address information | Indicates an STA or an STA group to receive a frame. |
| First duration or total protection duration | Indicates the whole duration for MU TXOP protection. The interval may indicate the whole duration for exchanging the trigger frame, an MU CST frame, DL MU data, and (ACK). |
| Second duration or response duration | Indicates a duration for reception of an MU CTS. The interval may indicate an duration for exchange between the trigger frame and an MU CST frame |
| Third duration or trigger frame duration | Indicates duration information with respect to a length of a PPDU having a trigger frame |
| Fourth duration | Indicates an duration to transmit a CTS frame |
| Resource allocation | Resource allocation information to transmit a CTS frame. A band or a channel (sub-channel index or sub-band index) allocated to each STA |

If one or more channels are idle for point coordination function (PCF) interframe space (PIFS), the AP transmits a trigger frame 710 through an idle channel. The trigger frame 710 is a frame which triggers transmission of a plurality of CTS frames to a plurality of STAs. The trigger frame 710 may refer to an RTS frame or a protection frame. The PIFS is illustrative purpose only and may refer to a first interval.

It is assumed that an STA 1 and an STA 2 are a destination STA to which the CTS frame is transmitted, and an STA 3 is not the destination STA. The number of destination STAs is illustrative purpose only.

The STA 1 and the STA 2 in which transmission of the CTS frame is allowed may transmit CTS frames 721 and 722 to the AP after a short interframe space (SIFS), respectively. Hereinafter, an SIFS is illustrative purpose only and may refer to a second interval. The CTS frames 721 and 722 are transmitted as a response of the trigger frame 710.

The STA 3 receiving the trigger frame 710 but where transmission of the CTS frame is not allowed may configure a NAV 730 using duration information of the trigger frame 710.

The AP receiving the CTS frame may transmit a DL MU data frame 750 to a plurality of STAs after an SIFS time. The STA 1 and the STA 2 may transmit ACK frames 761 and 762 with respect thereto to the AP, respectively.

If the AP does not receive the CTS frame from an STA, the AP may retransmit the trigger frame or abandon the whole DL MU TXOP after the SIFS.

In order to protect the DL MU TXOP, the STA may transmit a control frame or an NDP frame instead of the CTS frame to the AP after receiving the trigger frame. As the control frame, an ACK frame such as a block ACK Block-Ack, a Buffer Status Report frame, or a null data frame may be transmitted to the AP.

The fields may be included in a trigger frame as an MAC header of the trigger frame or MAC data.

Figure 8:
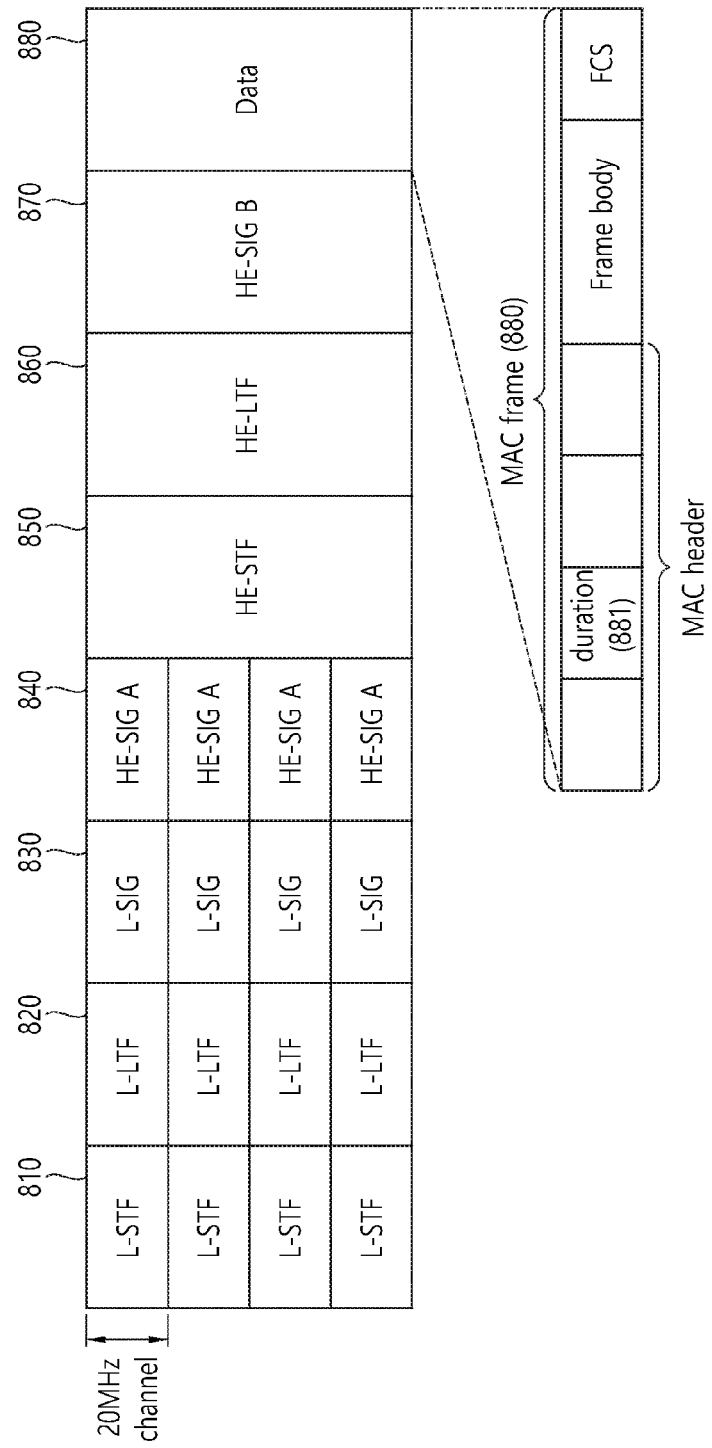
FIG. 8 illustrates an example of a PPDU format for a trigger frame according to an embodiment of the present invention.

FIG. 8 illustrates an example of a PPDU format for a trigger frame according to an embodiment of the present invention. The above represents an example applied to the trigger frame based on a PPDU format. The above is illustrative purpose only and is applicable to a trigger frame based on a PPDU formation of FIG. 4 or FIG. 5.

Information on a first duration may be included in an interval field 881 in an MAC header.

Information on a second duration may be included in one of L_SIG (830), HE-SIG A(840), or HE-SIG B 870 and a duration field 881.

Information on a third duration may be included in L-SIG 830 or HE-SIG A 840, or HE-SIG B 870.

Information on a fourth duration and resource allocation may be included in HE-SIG A 840 or HE-SIG B 870.

Meanwhile, an HE PPDU format may include HE-SIG A 840 and HE-SIG B 870 which are separated from each other, but HE-SIG A 840 and HE-SIG B 870 are not separated from each other but may be configured by one HE-SIG field. In this case, information on the second duration, information on the third duration, and information on the fourth duration may be included in an HE-SIG field.

A legacy STA receiving a trigger frame may recognize a first duration to update NAV configuration using the above. Accordingly, the DL MU TXOP by the trigger frame may be protected.

If the CTS frame is transmitted based on a HE PPDU formation, although a HE STA does not receive a trigger frame, the HE STA may update NAV configuration based on the CTS frame.

Further, if the CTS frame is transmitted with an HE PPDU format, information on the first duration and PPDU length information of the CTS frame are transmitted to HE-SIG A or HE-SIG B. Accordingly, although the HE STA does not receive the trigger frame but receives only a PPDU preamble of a CTS frame, the HE STA may determine a channel Busy duration based on reception information.

Figure 9:
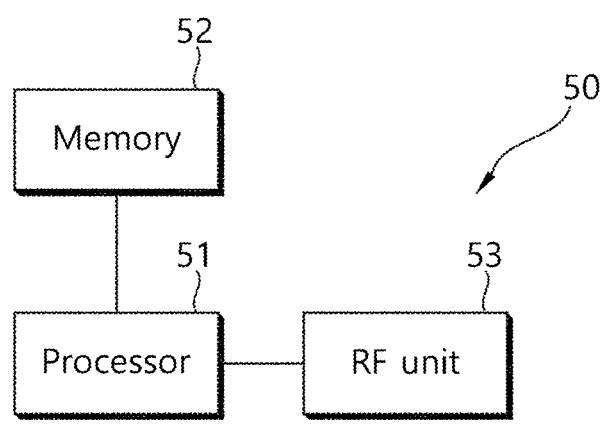
FIG. 9 is a block diagram illustrating a wireless apparatus in which an embodiment of the present invention is implemented.

FIG. 9 is a block diagram illustrating a wireless apparatus in which an embodiment of the present invention is implemented.

The wireless apparatus 50 includes a processor 51, a memory 52, and a radio frequency (RF) unit 53. The wireless apparatus may be an AP or a non-AP STA in the aforementioned embodiment. The RF unit 53 is connected with the processor 51 to transmit and/or receive a radio signal. The processor 51 implements a function, a process, and/or a method which are proposed. In embodiments of FIG. 7 and FIG. 8, an operation of an AP or a non-AP STA may be implemented by a processor 15. A memory 52 is connected to the processor 51 and is performed by the processor 51 to store a command to implement an operation of the AP or the non-AP STA.

The processor may include an application-specific integrated circuit (ASIC), another chip set, a logic circuit and/or a data processing apparatus. The memory may include a read-only memory (ROM), a random access memory (RAM), a flash memory, a memory card, a storage medium, and/or other storage device. The RF unit may include a baseband circuit for processing the radio signal. When the embodiment is implemented by software, the aforementioned technique may be implemented by a module (a process, a function, and the like) that performs the aforementioned function. The module may be stored in the memory and executed by the processor. The memory may be positioned inside or outside the processor and connected with the processor by various well-known means.

In the aforementioned embodiment, methods have been described based on flowcharts as a series of steps or blocks, but the methods are not limited to the order of the steps of the present invention and any step may occur in a step or an order different from or simultaneously as the aforementioned step or order. Further, it can be appreciated by those skilled in the art that steps shown in the flowcharts are not exclusive and other steps may be included or one or more steps do not influence the scope of the present invention and may be deleted.

What is claimed is:

1. A method for protecting a transmission opportunity (TXOP) in a wireless communication system, the method performed by a reception station (STA) and comprising:
receiving a trigger frame from a transmission station STA, the trigger frame comprising duration information for exchanging multiple clear-to-send (CTS) frames with the transmission STA;
transmitting one of the multiple CTS frames to the transmission STA based on the received trigger frame; and
receiving a multi-user (MU) DATA frame from the transmission STA based on the received trigger frame,
wherein the duration information includes first duration information indicating a time necessary for exchanging the trigger frame, the CTS frame, and the MU DATA frame and includes second duration information indicating a time necessary for exchanging the trigger frame and the CTS frame and includes third duration information related to a length of a Physical layer Protocol Data Unit (PPDU) including the trigger frame and includes fourth duration information indicating a time necessary for transmitting the one of the multiple CTS frames.

2. The method of claim 1, wherein the trigger frame further comprises information indicating whether the reception STA is allowed to transmit the one of the multiple CTS frames.

3. The method of claim 1, wherein:
the second duration is started when the trigger frame is received; and
the one of the multiple CTS frames is transmitted after the second duration expires.

4. The method of claim 1, wherein the transmission STA is an Access Point and the reception STA is a Mobile Station.

5. The method of claim 1, further comprising receiving an additional trigger frame from the transmission STA after the second duration expires if it is determined that the CTS frame is not received.

6. The method of claim 1, wherein the first duration information, the second duration information, the third duration information, and the fourth duration information are contained in a medium access control (MAC) header or MAC data.

7. The method of claim 1, wherein the first duration information is contained in a medium access control (MAC) header.

8. The method of claim 1, wherein the second duration information is contained in a medium access control (MAC) header.

9. The method of claim 1, wherein the second duration information is contained in a legacy SIGNAL field (L-SIG), a high efficiency (HE)-SIG A or an HE-SIG B of the PPDU.

10. The method of claim 1, wherein the third duration information is contained in a high efficiency (HE)-SIG A, an HE SIG B or a legacy SIGNAL field (L-SIG) of the PPDU.

11. The method of claim 1, wherein the fourth duration is contained in a high efficiency (HE)-SIG A or an HE-SIG B of the PPDU.

12. The method of claim 1, wherein the second duration information, the third duration information and the fourth duration information are contained in a high efficiency (HE)-SIG of the PPDU.

13. A reception station (STA) for protecting a transmission opportunity (TXOP) in a wireless communication system, the reception STA comprising:
a radio frequency (RF) unit configured to transmit and receive radio signals; and
a processor connected to the RF unit and configured to:
control the RF unit to receive a trigger frame from a transmission station (STA), the trigger frame comprising duration information for exchanging multiple clear-to-send (CTS) frames with the transmission station STA;
control the RF unit to transmit one of the multiple CTS frames to the transmission STA based on the received trigger frame; and
control the RF unit to receive a multi-user (MU) DATA frame from the transmission STA based on the received trigger frame,
wherein the duration information includes first duration information indicating a time necessary for exchange of the trigger frame, the CTS frame, and the MU DATA frame and includes second duration information indicating a time necessary for exchange of the trigger frame and the CTS frame and includes third duration information related to a length of a Physical layer Protocol Data Unit (PPDU) including the trigger frame and includes fourth duration information indicating a time necessary to transmit the one of the multiple CTS frames.

14. The method of claim 13, wherein the first duration information is contained in a medium access control (MAC) header.

15. The method of claim 13, wherein the second duration information is contained in a medium access control (MAC) header.

16. The method of claim 13, wherein the second duration information is contained in a high efficiency (HE)-SIG A or an HE-SIG B of the PPDU.

17. The method of claim 13, wherein the third duration information is contained in a high efficiency (HE)-SIG A, an HE-SIG B or an L-SIG of the PPDU.

18. A method for protecting a transmission opportunity (TXOP) in a wireless communication system, the method performed by a transmission station (STA) and comprising:
   transmitting a trigger frame to multiple reception STAs, the trigger frame comprising duration information for exchanging multiple clear-to-send (CTS) frames with the multiple reception stations STA;
   receiving the multiple CTS frames based on the transmitted trigger frame; and
   transmitting a multi-user (MU) DATA frame to the multiple reception STAs based on the transmitted trigger frame,
   wherein the duration information includes first duration information indicating a time necessary for exchanging the trigger frame, the multiple CTS frames, and the MU DATA frame and includes second duration information indicating a time necessary for exchanging the trigger frame and the multiple CTS frames, and includes third duration information related to a length of a Physical layer Protocol Data Unit (PPDU) including the trigger frame and includes fourth duration information indicating a time necessary for transmitting the one of the multiple CTS frames.

19. The method for claim 18, wherein:
   the second duration is started when the trigger frame is transmitted; and
   the multiple CTS frames are received after the second duration expires.

20. The method of claim 18, wherein further comprising transmitting an additional trigger frame to the multiple reception STAs after the second duration expires if the multiple CTS frame are not received.

* * * * *